United States Patent [19]
Taga et al.

[11] Patent Number: 5,585,954
[45] Date of Patent: Dec. 17, 1996

[54] APPARATUS FOR MEASURING OPTICAL TRANSMISSION CHARACTERISTIC

[75] Inventors: Hidenori Taga, Sakado; Shu Yamamoto, Shiki; Shigeyuki Akiba, Tokyo, all of Japan

[73] Assignee: Kokusai Denshin Denwa Kabushiki Kaisha, Tokyo, Japan

[21] Appl. No.: 346,092

[22] Filed: Nov. 29, 1994

[30] Foreign Application Priority Data

Dec. 1, 1993 [JP] Japan ................................ 5-325767

[51] Int. Cl.$^6$ .......................... H04B 10/08; H04B 10/00
[52] U.S. Cl. .......................... 359/158; 359/110; 359/189; 371/5.1
[58] Field of Search ...................... 359/158, 110, 359/161, 174, 175, 177, 179, 195, 341, 337, 348; 371/5.1, 5.2

[56] References Cited

PUBLICATIONS

S. Yamamoto, N. Edagawa, H. Taga, Y. Yoshida and H. Wakabayashi, "Observation of BER Degradation Due to Fading in Long–Distance Optical Amplifier System." In *IEEE Electronics Letters*, vol. 29, No. 2 (21 Jan. 1993), pp. 209–210.

Peter K. Runge and Hiroharu Wakabayashi, "Resultats et Demonstration de l'Infrastructure de Test d'un System Optique de 9000 km [9000 km Optical Amplifier System Test Facility Results]." In *SUBOPTIC '93*, S4.1, pp. 81–84.

Neal S. Bergano, F. W. Kerfoot and C. R. Davidson, "Margin Measurements in Optical Amplifier Systems." In *IEEE Photonics Technology Letters*, vol. 5, No. 3 (Mar. 1993), pp. 304–306.

Marcuse, Derivation of Analytical Expressions for BE Probability in Ligtwave Systems with Optical Amplifiers, 1990 IEEE.

Giles et al, Propagation of Signal and Noise in Concatenated Erbium–Doped Fiber Optic Amplifiers, 1991 IEEE.

Humblet et al, On the Bit Error Rate of Lightwave Systems with Optical Amplifiers, 1991 IEEE.

*Primary Examiner*—Leo Boudreau
*Assistant Examiner*—Rafael Bacares
*Attorney, Agent, or Firm*—Emmanuel J. Lobato

[57] ABSTRACT

An apparatus for measuring optical transmission characteristic, which has an input unit of data signal and of clock pulses, a signal decision unit, a display unit and a control unit. The signal decision unit comprises a plurality of signal decision circuits. A Q value employed as a parameter for the evaluation of the transmission characteristic of an optical communication system can be obtained in real time since bit error rates necessary for the calculation of the Q value can be simultaneously obtained by the plurality of signal decision circuits.

2 Claims, 4 Drawing Sheets (a)

(b)

(a)

(b)

(c)

(a)

(b)

(c)

APPARATUS FOR MEASURING OPTICAL TRANSMISSION CHARACTERISTIC

BACKGROUND OF THE INVENTION

The present invention relates to an apparatus for measuring a Q value which is a parameter for the evaluation of the transmission characteristic of an optical communication system.

In the evaluation of the characteristic of an optical fiber communication system, a bit error rate (BER) has usually been used as a parameter for the performance evaluation. The bit error rate is defined by the rate of the number of erroneously received bits to the total number of bits received per second; when the bit error rate is very low (for example, $10^{-14}$ or below), its measurement is time-consuming. In a system having a transmission rate of five gigabits per second, for instance, a minimum of six hours or so is needed to measure the bit error rate of $10^{-14}$ or below.

A system employing an optical amplifier as an optical repeater is now approaching practical use as a next-generation optical communication system; it has been reported, however, that such a system suffers a fading phenomenon that the bit error rate undergoes temporal variations owing to characteristics of optical components of the system (S. Yamamoto et al., "OBSERVATION OF BER DEGRADATION DUE TO FADING IN LONG-DISTANCE OPTICAL AMPLIFIER SYSTEM", IEEE Electronics Letters, vol. 29, no. 2, pp. 209–210). If we need many hours to measure the bit error rate in such a system, the measured bit error rate will be limited under the influence of the fading phenomenon. In a six-hour measurement of a system which primarily demonstrates under 10–14 bit error rate, for instance, if the bit error rate becomes worse than $10^{-10}$ even at an instant, the mean value of the bit error rate for six hours will not reach $10^{-14}$, making it impossible to measure the system performance. Hence, in such a system, the bit error rate counts for nothing as the parameter for the evaluation of the characteristic of the system.

It is a Q value that has been proposed as the parameter for the evaluation of such a system as mentioned above. The Q value indicates the SN ratio of an electric signal in an optical receiver and is defined by Eq. (1).

$$Q=|\mu_m-\mu_s|/(\sigma_m+\sigma_s) \quad (1)$$

where $\mu_m$ is the mean value of mark levels, $\mu_s$ the mean value of space levels, $\sigma_m$ a standard deviation of the mark level and is a standard deviation of the space level. The value BER ($V_{th}$) of the bit error rate at a certain signal decision threshold level $V_{th}$ is expressed by Eq. (2).

$$BER(V_{th})=[erfc\{(|\mu_m-V_{th}|)/\sigma_m\}+erfc\{(|\mu_s-V_{th}|)/\sigma_s\}]/2 \quad (2)$$

where erfc is indicative of an error function. At the signal decision threshold level which makes the value EBR optimal, Eq. (2) is rewritten using Eq. (1) as follows:

$$BER=erfc(Q) \quad (3)$$

It is seen from Eq. (3) that the measurement of the Q value and the measurement of the bit error rate are equivalent, since the Q value has a one-to-one correspondence with the bit error rate. The measurement of a very low bit error rate requires as long time as several hours, but the measurement of the Q value can be made in a relatively short time ranging from several to tens of minutes, and hence is not so badly affected by the fading phenomenon as in the case of the bit error rate measurement.

One possible method for measuring the Q value is to use a digital storage scope and calculate the Q value from histograms of mark levels and space levels stored or accumulated with time (P. K. Runge et al., "9000 KM OPTICAL AMPLIFIER SYSTEM TEST FACILITY RESULTS", Sub-optics '93, S4.1). The latest digital storage scope incorporates histogram mean value and standard deviation calculating features and allows ease in measuring the Q value. However, the Q value obtainable with this method does not exactly correspond to the bit error rate owing to a quantization error of the digital storage scope.

To measure the Q value which corresponds precisely with the bit error rate, there has been proposed a method which measures the bit error rate at a plurality of decision threshold levels while changing the decision threshold of an error detector and calculates the Q value by interpolating the bit error rate thus measured (N. S. Bergano et al., "Margin Measurements in Optical Amplifier Systems", IEEE Photonics Technology Letters, vol. 5, no. 3, pp. 304–306).

Since the error detector available at the present has only one signal decision circuit, however, the abovementioned method inevitably involves the repetition of works of changing the signal decision threshold level of the error detector and measuring the bit error rate at each decision threshold level. As a result, the measurement takes several to tens of minutes, leading to a defect that the measured values become less accurate under the influence of the fading phenomenon.

SUMMARY OF THE INVENTION

It is therefore an object of the present invention to provide an optical transmission characteristic measuring apparatus which permits reduction of the Q value measuring time and highly-accurate, real-time Q value measurements free from the influence of the fading phenomenon.

To attain the above object, the apparatus of the present invention is made up of data and clock signal input units, a signal decision unit formed by a plurality of signal decision circuits, a display unit for displaying measured results, and a control unit for controlling the respective units. Since the conventional error detector has only one signal decision circuit as referred to previously, it is necessary to repeat measuring operations the bit error rate at a plurality of signal decision threshold levels. According to the present invention, however, the provision of the plurality of signal decision circuits enables the bit error rate to be measured simultaneously at a plurality of decision threshold levels on a real-time basis; hence, data for the calculation of the Q value can be obtained in real time.

BRIEF DESCRIPTION OF THE DRAWINGS

The present invention will be described in detail below with reference to the accompanying drawings, in which.

DESCRIPTION OF PREFERRED EMBODIMENTS

The fading phenomenon of the bit error rate, which occurs when receiving an optical signal in an optical fiber transmission line, is attributable to the polarization dispersion of the optical fiber transmission line, the polarization dependence loss of an optical amplifier in the optical fiber transmission line and so on. These factors cause variations in the "1" and "0" levels of a digital signal at the receiving end, and hence induces a bit error, resulting in the fading of the bit error rate. In the Q value measurement by the conventional bit error rate measuring apparatus, the bit error rate is measured repeatedly at a plurality of predetermined signal decision threshold levels one at a time in a sequential order; in this instance, there is a possibility that as the measurement proceeds, measured values of the bit error rate deviates badly from the actual values owing to a growing influence of the fading of the bit error rate. This will briefly be described with reference to FIGS. 4 and 5. When measuring the bit error rate at signal decision threshold levels which are set sequentially in the range from the "1" to the "0" level of the digital signal, the measured bit error rate usually decreases down to an unmeasurably small value and then increases again to larger values. This is shown in FIG. 5($a$). The Q value desired to obtain is at the intersection of extensions of the lines $\alpha$ and $\beta$ in FIG. 5($a$) which plot the measured values.

Figure 4:
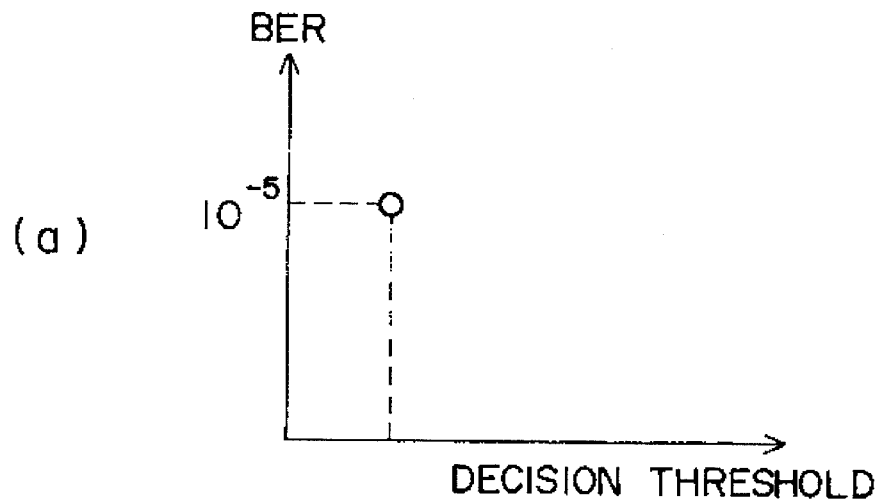
FIG. 4 illustrates diagrams explanatory of the operation of a prior art example.
Figure 4:
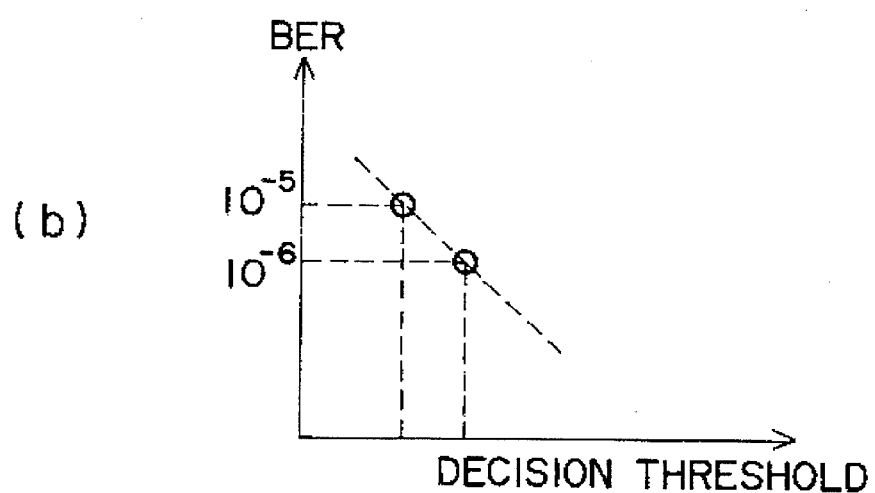
Figure 4:
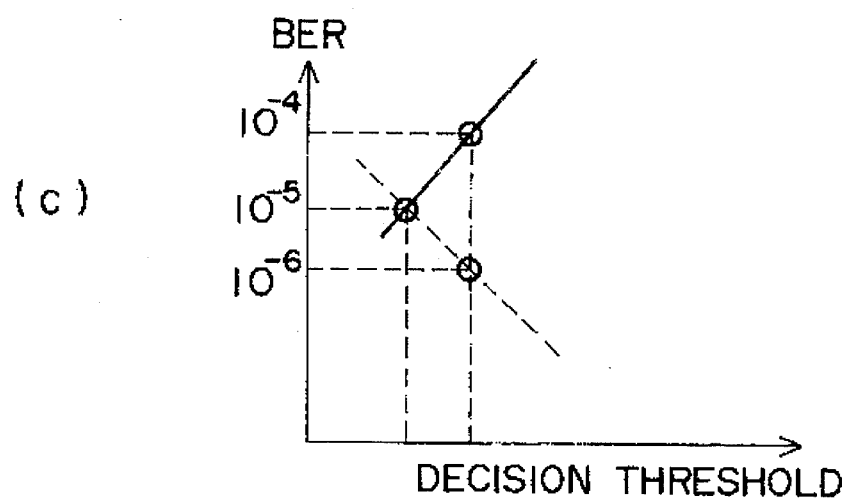
Figure 5:
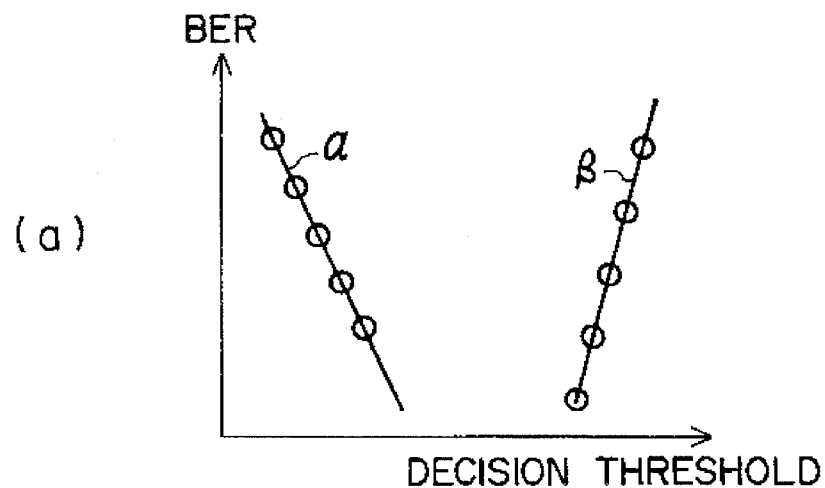
FIG. 5 illustrates diagrams explanatory of the operations of the prior art and the present invention in comparison with each other.
Figure 5:
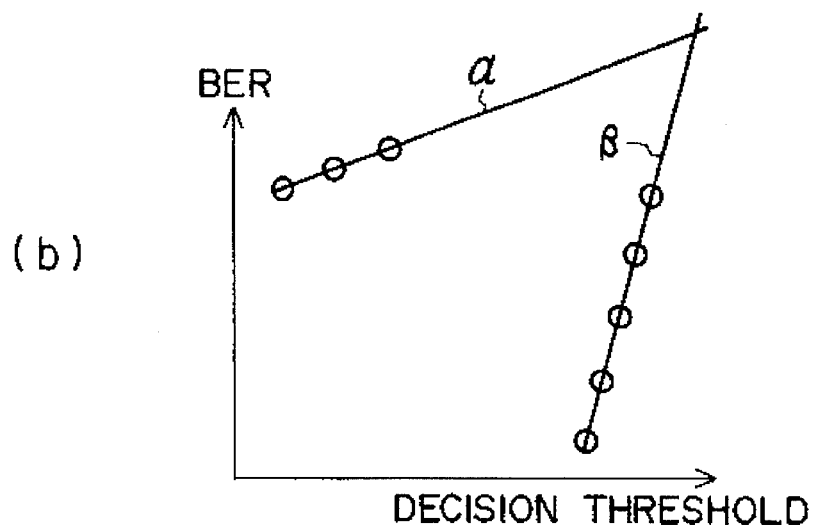
Figure 5:
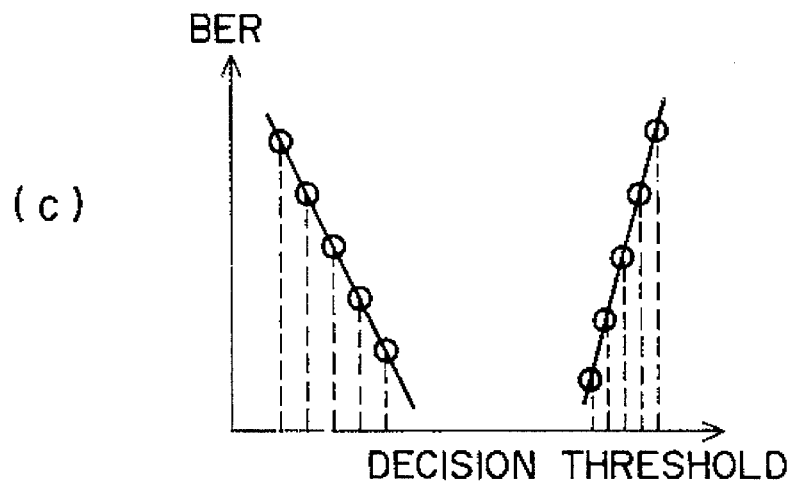

Now, let it be assumed that the value of the bit error rate measured at a certain signal decision threshold level is $10^{-5}$ [FIG. 4($a$)] and that the bit error rate is to be measured next at a predetermined threshold level where it ought to be $10^{-6}$ [FIG. 4($b$)]. Suppose that while changing the threshold level to the next one, the fading of the bit error rate occurs, resulting in the measured value at the new level becoming $10^{-4}$ [FIG. 4($c$)]; in this situation, the Q value that will ultimately be obtained is far apart from the value primarily intended to obtain. The lines plotting the bit error rate values that should have been measured ought to take on a V-shaped pattern about the final decision threshold level [FIG. 5($a$)]. In such a situation as mentioned above, however, one of the lines plotting the measured values is inverted in its polarity of slope as indicated by the line $\alpha$ in FIG. 5($b$) and the lines show an inverted V-letter shape [FIG. 5($b$)]. Thus, the Q value at the intersection of the lines $\alpha$ and $\beta$ in FIG. 5($b$), which is calculated from such measured values of the bit error rate has no meaning. The present invention effectively prevents the occurrence of the above-described phenomenon.

According to the present invention, a plurality of signal decision circuits measure the bit error rate simultaneously at a plurality of decision threshold levels on a real-time basis [FIG. 5($c$)]; hence, the Q value can be measured without being affected by the fading phenomenon even in its presence. Since the bit error rate at every decision threshold level is measured at the same time, there is no possibility of incurring the disadvantages of the prior art that stem from different timing of measurement at individual signal decision threshold levels.

Figure 1:
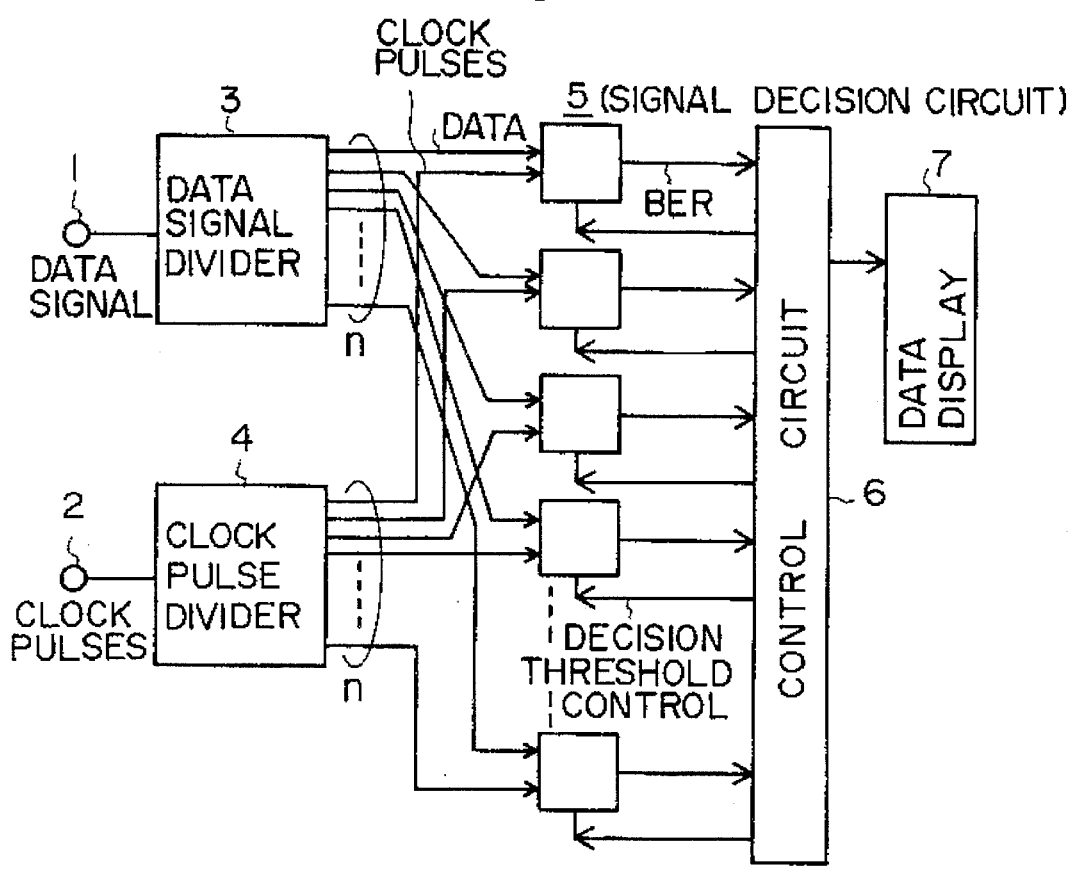
FIG. 1 is a block diagram illustrating an embodiment of the present invention.

FIG. 1 illustrates in block form an embodiment of the present invention. Reference numeral 1 denotes a data signal input terminal, 2 clock pulse input terminal, 3 a data signal divider for dividing a data signal into n, 4 a clock pulse divider for dividing a clock pulse into n, 5 signal decision circuits, 6 a control circuit and 7 a data display. The apparatus of the present invention has n signal decision circuits 5; the value of n varies with the accuracy necessary for measurement and is four at minimum. This embodiment will hereinafter be described on the assumption that the value of n is ten.

Figure 2:
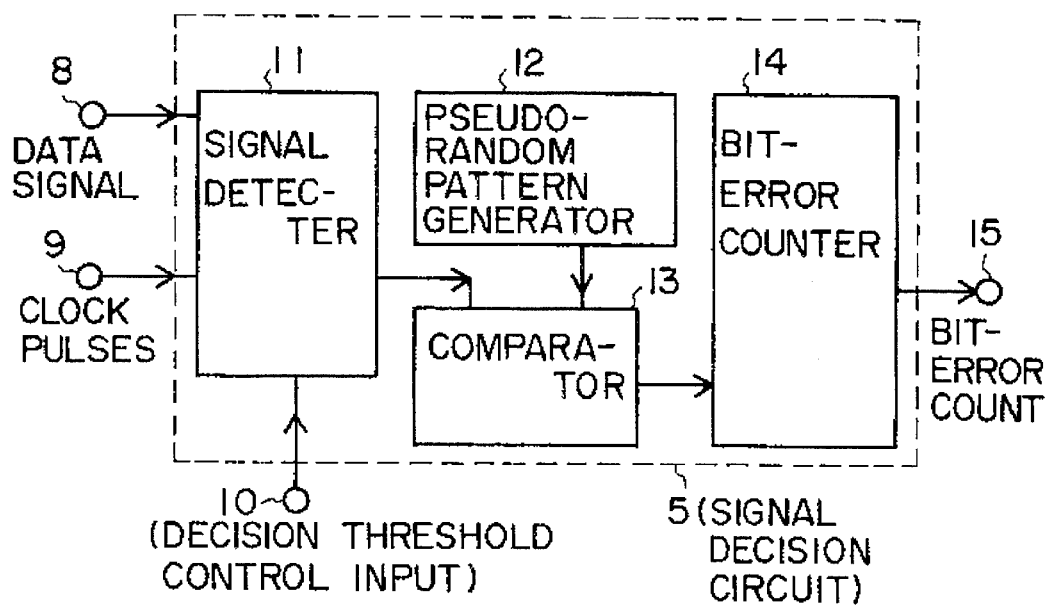
FIG. 2 is a block diagram illustrating an example of a signal decision circuit for use in the embodiment of FIG. 1.

FIG. 2 illustrates in block form an example of the signal decision circuit 5. Reference numeral 8 denotes a data signal input terminal, 9 a clock pulse input terminal, 10 a decision threshold control input terminal, 11 a signal detector, 12 a pseudo-random pattern generator, 13 a comparator, 14 a bit-error counter and 15 a bit-error count output terminal. The signal detector 11 makes a check to determine if a signal from the data signal input terminal 8 is a "1" or "0" at the signal decision threshold level corresponding to the data signal from the decision threshold control input terminal 10 and provides a detected output ("1" or "0") to the comparator 13. The comparator 13 compares the output signal from the signal detector 11 with the output signal from the pseudo-random pattern generator 12 and, when the both signals differ from each other, sends a bit-error signal to the bit-error counter 14. The bit-error counter 14 counts bit errors on the basis of such signals from the comparator 13 and sends the bit-error count value to the control circuit 6 via the bit-error count output terminal 15.

The control circuit 6 sets a different signal decision threshold level in each signal decision circuit 5 via the decision threshold control input terminal 10. This embodiment has ten signal decision circuits 5, and hence ten signal decision threshold levels are set by a control signal from the control circuit 6. The signal decision threshold levels of the individual signal decision circuits are controlled by a controller so that the bit error rate to be measured may take the value necessary for the calculation of the Q value (in the range of $10^{-5}$ to $10^{-10}$ in an example described in the afore-mentioned prior art literature by N. S. Bergano et al.).

Figure 3:
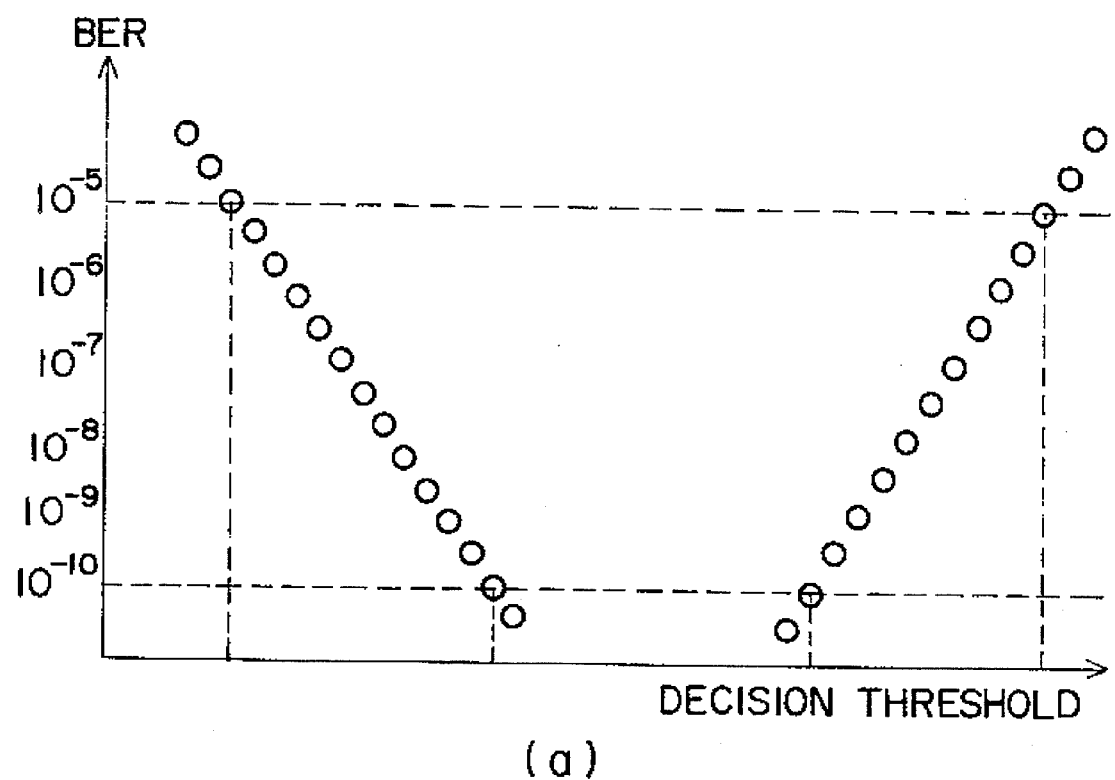
FIG. 3 illustrates diagrams explanatory of a signal decision threshold level control method in the embodiment of FIG. 1.
Figure 3:
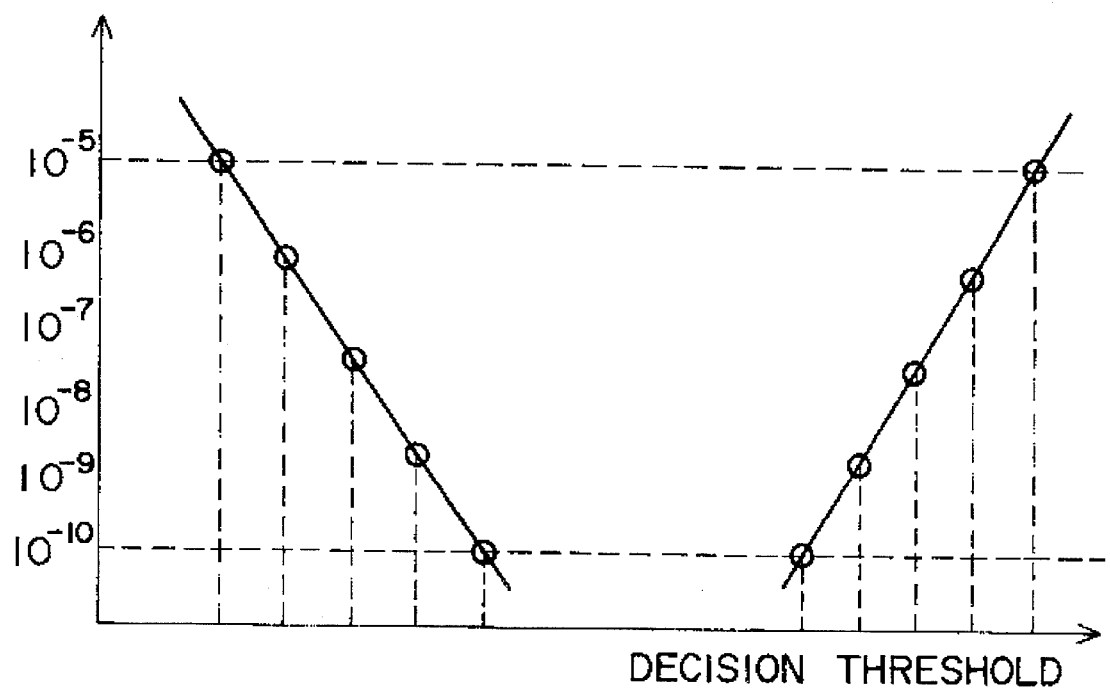

The signal decision threshold level of each signal decision circuit is controlled, for example, by such procedures as listed below. (Procedure 1) One of the signal decision circuits 5 is used to measure the bit error rate at each of continuously varied signal decision threshold levels for a short period of time [FIG. 3($a$)]. The range over which to vary the signal decision threshold level is dependent on the voltage of the digital signal that is applied to the data signal input terminal or the variable range of the signal decision threshold level.

(Procedure 2) The bit error rate data obtained by Procedure 1 is used to determine the ranges of the signal decision threshold level over which the bit error rate takes values from $10^{-5}$ to $10^{-10}$ in connection with "1" and "0" of the digital signal, respectively. The ranges of the signal decision threshold level are divided into quarters and the resulting five signal decision threshold levels are set in each signal decision circuit 5 at the "1" and the "0" side of the digital signal, respectively. [FIG. 3($b$)].

(Procedure 3) The work of Procedures 1 and 2 requires a setting time of several minutes, but after the setting, the bit error rate is measured by one operation in real time at the signal decision threshold levels determined by Procedure 2; that is, the bit error rate can be measured in real time.

The bit error rate thus measured at each signal decision threshold level is provided from the bit-error rate counter 14 of each signal decision circuit 5 to the control circuit 6 via the bit-error count output terminal 15, and the control circuit 6 calculates the Q value, using Eq. (1). The values $\mu_m$, $\mu_s$, $\sigma_m$ and $\sigma_s$ necessary for the calculation of the Q value can be obtained by such a method as described below. In a case where the signal decision threshold level takes the same value as $\mu_m$ (or $\mu_s$) in Eq. (2), the value of the bit error rate that is measured in this instance becomes one-half; by interpolating the actually measured value of the bit error rate, the signal decision threshold level at which the bit error rate becomes one-half is obtained, and this level is equal to the value $\mu_m$ (or $\mu_s$). When $|\mu_s|>>|V_{th}|$ in Eq. (2), the second term on the right-hand side is negligibly small; hence, Eq. (2) can be approximated as follows:

$$BER(V_{th}) \approx [erfc\{(|\mu_m - V_{th}|)/\sigma_m\}]/2 \quad (4)$$

Similarly, when $|\mu m|>>|V_{th}|$, the first term on the right-hand side is negligibly small, and hence, Eq. (2) is approximated as follows:

$$BER(V_{th}) \approx [erfc\{(|\mu_s - V_{th}|)/\sigma_m\}]/2 \quad (5)$$

It is seen from Eqs. (4) and (5) that the interpolation of the actually measured value of the bit error rate with the error function erfc will provide the values $\sigma_m$ and $\sigma_s$ as one of parameters of the interpolation curve. In a graph wherein the ordinate represents erfc$^{-1}$ (log BER) and the abscissa the signal decision threshold level, the measured values of the bit error rate are interpolated with a straight line and the value $\sigma$ is obtained from the slope of the straight line.

Since these equations necessary for the calculation of the Q value can be implemented by electronic circuits, the time for the calculation is so short that the Q value can be measured in real time. The calculated Q value is displayed on the data display 7, which may be either of digital and analog displays. By suing a pen recorder or the like as the data display 7, the temporal variations of Q value can also be displayed on a real time basis.

As described above in detail, the present invention brings about such effects as listed below.

1) Since the bit error rate can be measured simultaneously at a plurality of signal decision threshold levels, the time for measuring the Q value can substantially be reduced. According to the prior art, the bit error rate is measured at the signal decision threshold levels one at a time, and consequently, the measurement of the Q value requires at least several minutes even if optimization is carried out. In contrast to this, the present invention permits real-time measurement.

2) Since the bit error rate can be measured simultaneously at all the signal decision threshold levels necessary for the calculation of the Q value, it is possible to eliminate the uncertainty in the measurement of the bit error rate which is attributable to the fading phenomenon in the transmission line, providing for increased accuracy in the measurement of the Q value. According to the prior art, since the bit error rate is not measured simultaneously at the individual signal decision threshold levels, the Q value may become negative in extreme cases, but the present invention is free from such a defect.

The above-mentioned effects are unobtainable with the prior art, and hence the present invention is of great utility in practical use. In particular, in the analysis of the fading phenomenon of the optical fiber transmission line, the prior art method provides only discrete Q value data but the present invention provides real time data, and hence is very effective in enhancing the accuracy of analysis.

What we claim is:

1. An apparatus for measuring a Q value indicative of the SN ratio of an electric signal in an optical receiver, the Q value being a parameter for the evaluation of the transmission characteristic of an optical communication system employing an optical fiber transmission line and being defined by the following equation:

$$Q=|\mu_m-\mu_s|/(\sigma_m \leftrightarrows \sigma_s)$$

where $\mu_m$ is the mean value of the mark level, $\mu_s$ the means value of the space level, $\sigma_m$ a standard deviation of the mark level and $\sigma_s$ a standard deviation of the space level, said apparatus comprising;

signal input means for dividing a data signal converted from an optical signal having propagated over said optical fiber transmission line into n equal data signals and clock pulses extracted from said data signal into n equal clock pulse trains;

signal decision means composed of n signal decision circuits, for simultaneously detecting in time with pulses of the respective n clock pulse trains the bit error rates of said n divided data signals in real time with reference to respective decision threshold levels;

control means for controlling the respective decision threshold levels of said signal decision means and calculating said Q value on the basis of said real time bit error rates detected by said signal decision means; and data display means for displaying said Q value.

2. An apparatus according to claim 1, in which each of said signal decision circuits comprises:

a data signal input terminal for receiving the divided data signal from the signal input;

a clock pulse input terminal for receiving the divided clock pulses from the signal input;

a decision threshold control input terminal for receiving one of the decision threshold levels;

a pseudo-random pattern generator for generating a pseudo-random pattern;

a signal detector connected to the data signal input terminal, the clock pulse input terminal and the decisions threshold control input terminal for detecting stages of the divided data signal from the data signal input terminal with reference to the one decision threshold level in time with the clock pulses from the clock pulse input terminal to produce a detected output;

a comparator receptive of the detected output and the pseudo-random pattern and generates a bit-error signal when the respective states of the detected output and the pseudo-random pattern are different from each other; and a bit-error counter receptive of the bit-error signal for counting bit-errors on the basis of the bit-error signal to send out a bit-error count value.

* * * * *